United States Patent [19]
Benz

[11] 3,855,724
[45] Dec. 24, 1974

[54] ANIMAL TRAP

[76] Inventor: Michael Benz, 68 3rd Ave., Williams Lake, British Columbia, Canada

[22] Filed: Apr. 26, 1974

[21] Appl. No.: 464,598

[52] U.S. Cl. ................................................. 43/92
[51] Int. Cl. ........................................... A01m 23/26
[58] Field of Search ................ 43/88, 90, 92, 93, 94

[56] References Cited
UNITED STATES PATENTS

| 1,064,633 | 6/1913 | Force | 43/93 |
| 1,546,066 | 7/1925 | Gagne | 43/92 |
| 1,617,987 | 2/1927 | Bond | 43/93 |

*Primary Examiner*—Warner H. Camp

[57] ABSTRACT

A pair of animal trap frames are pivotally mounted on a base about a common axis to form, by their side members, a pair of coacting jaws. Springs, connected to ring members are slidable along end members of the frames, to urge the jaws to a closed position. A pair of triggers, pivotally mounted on the base, are adapted to retain the ring members adjacent the base when the trap is in the open position. One trigger is provided with a hollow disc member which is in sliding contact with the tip of the second trigger. A pivotally mounted bait holder extends through the hollow disc and is provided with a plate member which contacts the hollow disc member. As bait is pulled off the bait holder, the plate member tilts and depresses the hollow disc which in turn causes both triggers to depress and release the rings. The springs then cause the trap to close.

6 Claims, 3 Drawing Figures

ANIMAL TRAP

This invention relates to animal traps for catching a variety of wild animals.

There are many animal traps known to the prior art, such as those described in U.S. Pat. Nos. 3,010,245, issued Nov. 28, 1961, to Conibear, and 2,947,107, issued Aug. 2, 1960, to Lehn, which are of the relatively humane type in which the animal is quickly killed by the closing of the jaw frames on the neck causing breakage thereof or choking or suffocating due to the pressure applied to throat or lungs. Other traps of the gin or leg trap variety are described, for example in Canadian Pat. Nos. 262,349 to Nelson, and 251,087 to Gagne. All of the prior art traps have certain disadvantages arising from humane considerations, portability by the trapper, cost, effectiveness under adverse conditions and ease of fabrication and operation.

It is an object of the present invention to provide an improved animal trap which will meet trappers' requirements as well as taking humane considerations into account. A trap according to the invention is effective only for animals of a size for which the trap is designed or for which the trap can be adjusted, and it kills quickly by either breaking the animal's neck or by choking or suffocation caused by pressure on the lungs. The trap can be entered from either side if set on the ground, as the jaws are triggered independently of each other, and the trap can also be secured to a tree in an upright position.

According to the present invention, there is provided a trap comprising a pair of frames, each having a side member and a pair of spaced end members, pivotally mounted on a base about a common axis to form by their side members a pair of coacting jaws. A spring means, connected to ring members slidable along both sets of end members is used to urge the jaws to a closed position. A pair of triggers are pivotally mounted to the base and adapted to retain the ring members adjacent each other when the trap is in an open position. One trigger is provided with a hollow disc member which slidably contacts the second trigger. A bait holder including a solid plate member is pivotally secured to the base and extends through the hollow disc member such that the plate member engages the hollow disc member and is adapted to depress the hollow disc member and the triggers when the bait holder is moved thereby releasing the ring members and causing the trap to close.

The invention will now be described in more detail with reference to the accompanying drawings in which.

Figure 1:
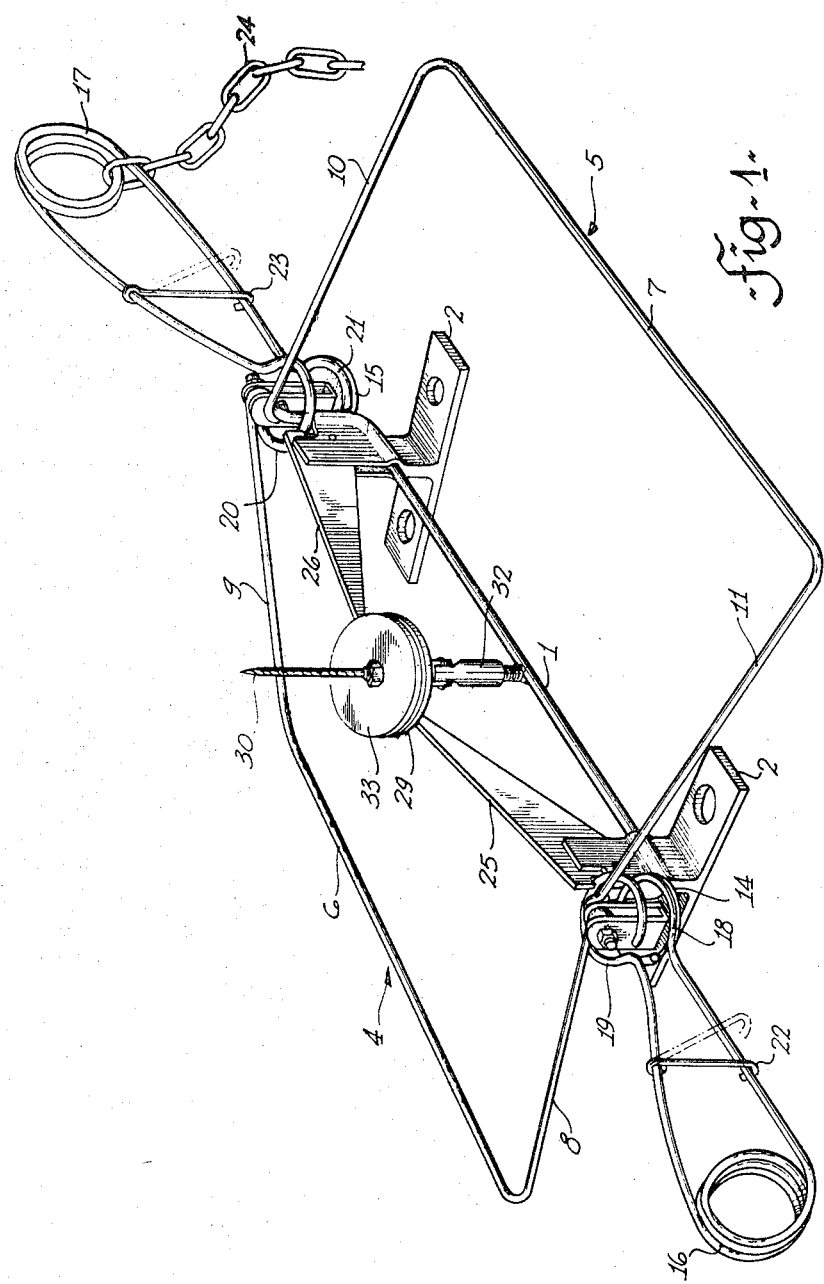
FIG. 1 is a perspective view illustrating the trap of the present invention in the open or set position.

In FIG. 1 there is shown a perspective view of the present trap in the open or set position. A base 1 having ground engaging plates 2 adapted to receive anchor pins (not shown) is provided. The base 1 is conveniently fabricated from a steel rod, the ends of which are shaped to provide, as seen more clearly in FIG. 3, pivot means 3. Two identical frames 4 and 5, conveniently fabricated from steel rod, are pivotally mounted at pivot points 3 to form the jaws of the trap. The frames 4 and 5 are conveniently but not essentially provided with elongated side members 6 and 7, respectively, and spaced end members 8, 9 and 10, 11, respectively, which are mounted on pivot means 3 for movement between the open position shown in FIGS. 1 and 2 and the closed position shown in FIG. 3.

For convenience, U-shaped end spacer members 12 and 13 are also pivotally mounted on pivot means 3, to separate the end members 8, 11 and 9, 10, respectively. Spacer members 12 and 13 are provided with end plates 14 and 15, respectively, which act as lower stops or anchors for the spring means described hereinafter. It will, however, be appreciated that washers or similar spacers could equally well be employed and the spring means anchored directly to base 1 in any number of alternative ways.

Springs 16, 17 of the conventional expanding pressure coil type are provided with ring members 18, 19 and 20, 21, respectively. Rings 18 and 21 are adapted to press on end plates 14 and 15, respectively, and rings 19 and 20 are adapted to slide along adjacent pairs of end members 8, 11 and 9, 10, respectively, thereby causing the jaws of the trap to close. In the compressed position, the rings 18, 19 and 20, 21 may be held together by hooks 22, 23 which are convenient safety devices to prevent premature or accidental springing of the trap while handling or setting.

A chain 24 may be provided for securing the trap to a post or tree, if desired.

Figure 2:
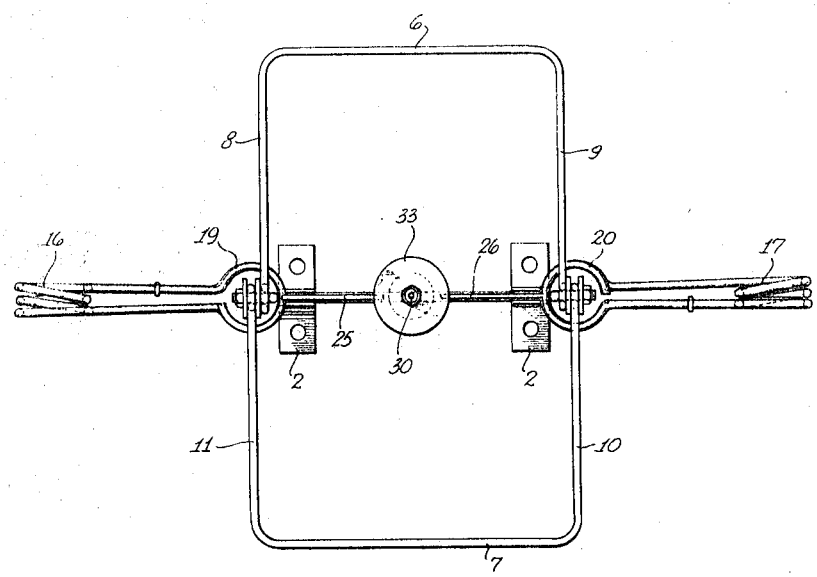
FIG. 2 is a plan view of the trap of FIG. 1 in the open or set position.
Figure 3:
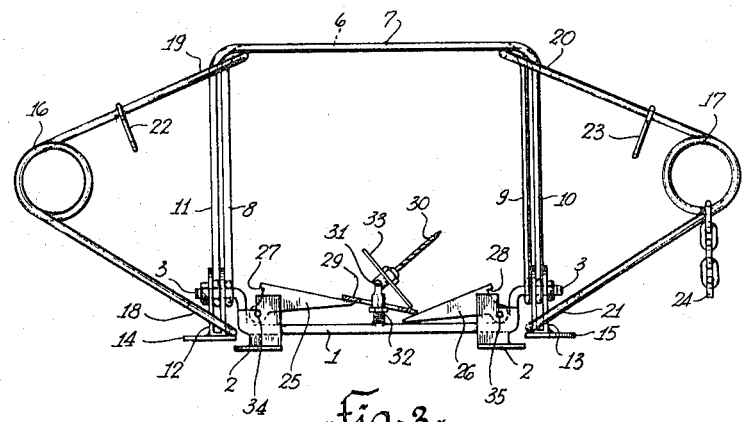
FIG. 3 is a side view of the trap of the present invention in the closed or sprung position.

In the set position, the safety hooks 22, 23 are released and the rings 19, 20 are held adjacent rings 18, 21 by means of the triggers 25 and 26, respectively. Triggers 25 and 26 are pivotally mounted on base 1 at 34, 35 and provided with catches 27 and 28 adapted to engage rings 19 and 20, respectively, as shown in FIGS. 1 and 2. Trigger 25 is provided with a rigidly mounted hollow disc plate 29 at the end opposite the pivot and plate 29 is adapted for sliding contact with the tip of trigger 26 remote from its pivot. A bait holder 30, of any convenient shape, is pivotally mounted at 31 on an extension 32 from base 1, and is provided with a solid plate member, conveniently a circular disc member 33, which is adapted to contact hollow disc plate 29. It will be noted that extension 32 extends through the hollow centre of disc plate 29.

When the trap is set, rings 19 and 20 are urged upwardly, under the action of springs 16 and 17, against catches 27 and 28. This upward force raises triggers 25 and 26 so that disc plate 29 is substantially horizontal and in adjacent relationship to disc 33 if not actually in contact therewith as shown in FIG. 1.

It will now be appreciated that any horizontal movement of bait holder 30, as by an animal attempting to tear bait therefrom, must cause a downward movement of disc 33 as holder 30 moves about its pivot 31. Disc 33 depresses hollow disc plate 29 causing catches 27 and 28 to move laterally toward holder 30 and releasing rings 19 and 20, which are urged rapidly along end members 8, 11 and 9, 10, respectively, under the action of springs 16 and 17, thereby causing the trap to spring shut with side members 6 and 7 coming into adjacent relationship.

The trap may be triggered by movement of the holder from any direction and by careful selection of the length of catches 27 and 28, and adjustment of the point of contact of trigger 26 with disc plate 29, as by raising or lowering of disc plates 29 and 33 by turning universal joint 31 in a clockwise fashion, which lessens the tension on the triggers, or counterclockwise, which tightens the tension on the triggers. The weight required to effect springing can be adjusted to any desired level, depending upon the type of animal to be trapped.

It will be appreciated that many modifications may be effected in the trap of the present invention without departing from the inventive concepts therein. For example, the side members may be bowed or curved for certain types of animal, and the relationship of the end members may be modified as required. The shape of disc plates 29 and 33 may be modified to be hexagonal, octagonal or even square if desired. As noted hereinbefore, rings 18 and 21 may be secured directly to base 1 in any known way, thereby eliminating U-shaped members 12 and 13. Other modifications will be apparent to those skilled in the art. Traps of the present invention can be readily manufactured in different sizes and are relatively inexpensive as only standard and cheap materials are required. The traps are light, easily and safely handled and because they are effective in trapping animals from almost any angle of approach they meet substantially all trapper requirements. They are also relatively humane and ensure rapid killing of the trapped animal.

I claim:

1. An animal trap comprising:
 a base;
 a pair of frames, each having an elongated side member and a pair of spaced end members, pivotally mounted on said base about a common axis such that said frames can rotate between an open position in which said side members are widely separated from each other and a closed position in which said side members are closely adjacent to each other;
 a ring member encircling each pair of adjacent end members and adapted to slide freely along each pair of said adjacent end members between said base and said side members;
 spring means adapted to urge said ring members towards said side members as said frames move to said closed position;
 trigger means adapted to maintain said frames in said open position against the action of said spring means and to be triggered to release the trap to said closed position, said trigger means comprising first and second trigger members pivotally mounted on said base and each adapted to releasably retain a said ring member adjacent said base when said trap is in said open position;
 a hollow disc member rigidly secured to said first trigger member remote from said pivotal mounting thereof and adapted to slidably contact said second trigger member; and
 bait holding means pivotally secured to said base intermediate said pairs of end members extending through said hollow disc member and including a plate member rigidly secured thereto, said plate member being adapted to engage and depress said hollow disc member and said trigger members upon movement of said bait holding means thereby releasing said ring members and causing said trap to close.

2. An animal trap as claimed in claim 1, wherein said side members are in substantially parallel relationship.

3. An animal trap as claimed in claim 2 wherein said plate member is a circular disc member.

4. An animal trap as claimed in claim 1, including ground securing means on said base.

5. An animal trap as claimed in claim 1, wherein said spring means comprise a pair of coil springs one end of each of which terminates in a said ring member, and the other end of each of which terminates in a second ring member adapted to be urged against said base.

6. An animal trap as claimed in claim 1, including spacer means between said end members pivotally mounted on said base, said spacer means including end plates adapted to retain one end of said spring means.

* * * * *